(12) United States Patent
Zargahi

(10) Patent No.: US 9,721,279 B2
(45) Date of Patent: Aug. 1, 2017

(54) DETERMINING MOBILE OPERATORS FOR MOBILE DEVICES

(75) Inventor: Kamran Rajabi Zargahi, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1081 days.

(21) Appl. No.: 12/729,429

(22) Filed: Mar. 23, 2010

(65) Prior Publication Data

US 2011/0238532 A1    Sep. 29, 2011

(51) Int. Cl.
| | | |
|---|---|---|
| G06Q 20/00 | (2012.01) | |
| G06Q 30/04 | (2012.01) | |
| H04W 4/24 | (2009.01) | |
| G06Q 30/06 | (2012.01) | |
| H04M 15/00 | (2006.01) | |
| G06Q 40/00 | (2012.01) | |

(52) U.S. Cl.
CPC ......... *G06Q 30/04* (2013.01); *G06Q 30/0641* (2013.01); *G06Q 40/123* (2013.12); *H04M 15/00* (2013.01); *H04M 15/44* (2013.01); *H04M 15/68* (2013.01); *H04M 15/70* (2013.01); *H04M 15/725* (2013.01); *H04M 15/751* (2013.01); *H04W 4/24* (2013.01)

(58) Field of Classification Search
CPC .............................. G06Q 20/14; H04W 4/24
USPC ....................... 705/36, 40, 27.1, 31; 707/769
See application file for complete search history.

(56) References Cited

U.S. PATENT DOCUMENTS

| | | |
|---|---|---|
| 5,894,322 A | 4/1999 | Hamano et al. |
| 6,178,331 B1 | 1/2001 | Holmes et al. |
| 6,408,173 B1 | 6/2002 | Bertrand et al. |
| 6,510,205 B2 | 1/2003 | Daimon et al. |
| 7,542,451 B2 | 6/2009 | Cooper et al. |
| 7,672,267 B2 * | 3/2010 | Tsai et al. ..................... 370/328 |
| 7,797,243 B2 * | 9/2010 | Stadelmann ......... G06Q 20/123 455/405 |
| 7,941,656 B2 | 5/2011 | Hans et al. |
| 8,078,158 B2 | 12/2011 | Backholm |
| 8,085,423 B2 | 12/2011 | Dowling et al. |
| 8,099,332 B2 | 1/2012 | Lemay et al. |

(Continued)

FOREIGN PATENT DOCUMENTS

WO    0106752 A1    1/2001

OTHER PUBLICATIONS

Kivisaari, Eino, "Mobile Broadcast Business Dynamics", Retrieved at << http://www.ebrc.fi/kuvat/Kivisaari_paper.pdf >>, 2006, pp. 5.

(Continued)

*Primary Examiner* — Steven Kim

(57) ABSTRACT

Determining a mobile operator for a mobile device. The mobile operator is determined using one or more of an international mobile subscriber identity (IMSI) and a current operator name (CON) and service provider name (SPN) pair. Correlations between the IMSI and mobile operators, and between the CON/SPN pairs and mobile operators, are maintained. Correlations between unrecognized CON/SPN pairs and mobile operators are created based on a quantity of requests received from the mobile devices. In some embodiments, identifying the mobile operator enables financial transactions by the mobile device when visiting, for example, a mobile applications store.

20 Claims, 3 Drawing Sheets

(56) References Cited

U.S. PATENT DOCUMENTS

| | | | |
|---|---|---|---|
| 8,116,728 B2* | 2/2012 | Cai | G06Q 30/04 455/406 |
| 8,132,256 B2* | 3/2012 | Bari | G06Q 30/04 726/21 |
| 8,166,106 B2* | 4/2012 | Biggs et al. | 709/203 |
| 8,180,333 B1* | 5/2012 | Wells et al. | 455/415 |
| 8,213,899 B1* | 7/2012 | Kindred | H04L 12/2856 379/114.27 |
| 8,422,428 B1* | 4/2013 | Hilyard | H04L 41/0654 370/328 |
| 2001/0049638 A1 | 12/2001 | Satoh | |
| 2002/0022483 A1* | 2/2002 | Thompson | H04L 12/1464 455/439 |
| 2004/0057442 A1 | 3/2004 | Westman et al. | |
| 2004/0162058 A1* | 8/2004 | Mottes | 455/411 |
| 2004/0258063 A1* | 12/2004 | Raith | H04L 12/5835 370/389 |
| 2005/0004875 A1* | 1/2005 | Kontio et al. | 705/52 |
| 2005/0119017 A1* | 6/2005 | Lovell et al. | 455/466 |
| 2006/0030315 A1* | 2/2006 | Smith et al. | 455/432.3 |
| 2006/0084410 A1* | 4/2006 | Sutaria et al. | 455/408 |
| 2007/0011334 A1 | 1/2007 | Higgins et al. | |
| 2007/0038519 A1 | 2/2007 | Johansson et al. | |
| 2007/0072605 A1* | 3/2007 | Poczo | 455/432.2 |
| 2007/0124490 A1* | 5/2007 | Kalavade | G06Q 20/14 709/230 |
| 2007/0167182 A1* | 7/2007 | Tenhunen et al. | 455/512 |
| 2007/0197189 A1* | 8/2007 | Horel et al. | 455/406 |
| 2007/0197216 A1* | 8/2007 | Wang | H04W 48/02 455/433 |
| 2008/0233918 A1 | 9/2008 | Pousti | |
| 2010/0026816 A1* | 2/2010 | Bergstrom | H04N 1/00183 348/207.11 |
| 2010/0124910 A1* | 5/2010 | Eich | H04L 67/18 455/414.1 |
| 2010/0153227 A1* | 6/2010 | Medvinsky | G06Q 20/123 705/26.1 |
| 2010/0216439 A1* | 8/2010 | Marcelli et al. | 455/414.1 |
| 2011/0106709 A1* | 5/2011 | Puura et al. | 705/64 |
| 2011/0195700 A1* | 8/2011 | Kukuchka et al. | 455/422.1 |
| 2011/0319074 A1* | 12/2011 | Adams | H04W 8/18 455/432.1 |
| 2012/0089521 A1* | 4/2012 | Abrevaya et al. | 705/75 |
| 2012/0302224 A1* | 11/2012 | Schreiner | H04W 8/205 455/418 |
| 2013/0163511 A1* | 6/2013 | Waldner | G07C 5/008 370/328 |

OTHER PUBLICATIONS

"First Chinese Office Action", Received for Application No. 201110078411.9, Mailed Date: Apr. 3, 2013, pp. 10.

"Rapidsoft Technologies Joins Windows Marketplace for Mobile with the Applications Developed on Windows Mobile OS", Retrieved at <<http://blog.taragana.com/pr/rapidsoft-technologies-joins-windows-marketplace-for-mobile-with-the-applications-developed-on-windows-mobile-os-7756/>>, Oct. 21, 2009, pp. 4.

Ayvazian, Berge., "Who is Minding the Mobile AppStores?", Retrieved at <<http://4gtrends.com/?p=1442>>, Aug. 19, 2009, pp. 6.

Duryee, Tricia., "CTIA: Microsoft's Marketplace Will Have Carrier Billing; Facebook, Wallpapers Coming Too", Retrieved at <<http://moconews.net/article/419-ctia-microsofts-marketplace-will-have-carrier-billing-facebook-wallpape/>>, Mar. 30, 2009, pp. 2.

Higginbotham, Stacey., "Telstra's Planned App Store is a Shift for Carriers", Retrieved at <<http://gigaom.com/2009/02/24/telstras-planned-app-store-is-a-shift-for-carriers/>>, Feb. 24, 2009, pp. 11.

Ho, Victoria., "Ovum: Let OS-Makers Run App Stores", Retrieved at <<http://www.zdnetasia.com/news/communications/0,39044192,62051325,00.htm>>, Feb. 20, 2009, pp. 3.

Zheng, Long., "Microsoft to Launch "Skymarket" Applications Marketplace for Windows Mobile 7", Retrieved at <<http://www.istartedsomething.com/20080831/microsoft-launch-skymarket-applications-marketplace-windows-mobile-7/>>, Aug. 31, 2008, pp. 10.

Kowalczyk, et al., "InterMarket—Towards Intelligent Mobile Agent e-Marketplaces", Retrieved at <<http://ieeexplore.ieee.org/stamp/stamp.jsp?arnumber=00999849>>, Proceeding of the 9th IEEE International Conference on Engineering of Computer-Based Systems, Apr. 2002, pp. 8.

"Second Chinese Office Action", Received for Application No. 201110078411.9, Mailed Date: Dec. 11, 2013, pp. 7.

"Standard PPC Platform Check", Published on: Mar. 31, 2007, Retrieved from: <<http://forums.webosnation.com/archive/index.php?t-140299.html>>, 4 pages.

"How to Retrieve Name of Current Operator on WM6 Device", Published on: May 8, 2009, Retrieved from: <<http://social.msdn.microsoft.com/Forums/en-US/2e6d0c04-3752-48b4-a4e0-adf86d27c4b2/how-to-retrieve-name-of-current-operator-on-wm6-device>>, 2 pages.

"Programmatically get the Current Network Operator Name", Published on: Oct. 2009, Retrieved from: <<http://android.riteshsahu.com/2009/10>>, 4 pages.

"How to get the Location/cell Information of the Device?", Published on: Mar. 28, 2009, Retrieved from: <<http://social.msdn.microsoft.com/Forums/en-US/e458185d-bfda-4218-89ce-ccd88869569d/how-to-get-the-locationcell-information-of-the-device>>, 2 pages.

"CRs to 22.101 Rel-4 and Rel-5 on Clarification of PLMN Name Indication and Service Provider Name Indication Feature", In Technical Specification Group Services and System Aspects, Jun. 18, 2001, 7 pages.

Third Office Action Issued in Chinese Patent Application No. 201110078411.9, Mailed Date: Jun. 26, 2014, 7 Pages.

* cited by examiner

DETERMINING MOBILE OPERATORS FOR MOBILE DEVICES

BACKGROUND

Mobile applications are a rapidly developing segment of the mobile market. The mobile applications are designed to run on handheld computers, personal digital assistants (PDAs), smartphones, cellular phones, and other mobile devices. Users shop for the mobile applications by visiting online application stores with their mobile devices and, as such, may change locations frequently during the visit. As the locations change, the mobile operators associated with the mobile devices may also change. Existing system fail to accurately determine and maintain knowledge of the mobile operator and market of the mobile devices during visits by the users to the application stores.

SUMMARY

Embodiments of the disclosure determine a mobile operator associated with a mobile computing device. An international mobile subscriber identity (IMSI) associated with the mobile computing device is received. A mobile country code (MCC) and a mobile network code (MNC) is extracted from the received IMSI. A mobile operator associated with the mobile computing device is determined based on the extracted MCC and MNC.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure enable identification of a mobile operator associated with a mobile computing device 102. In some embodiments, the identification occurs via an international mobile subscriber identity (IMSI) and/or a current operator name (CON) and service provider name (SPN). Identifying the mobile operator and market for the mobile computing device 102 enables financial calculations and transactions for the mobile computing device 102 based on the mobile operator. For example, aspects of the disclosure contemplate calculating taxes on purchases made by a user with the mobile computing device 102 from a mobile applications store 104.

The IMSI is a 15-digit value including a mobile country code (MCC), a mobile network code (MNC), and a mobile subscriber identification number (MSIN). The IMSI may be stored in a subscriber identity module (SIM) on the mobile computing device 102. The MCC is a three-digit value representing the country/locale of the mobile computing device 102. The MNC is a two- or three-digit value representing the mobile operator(s) the mobile computing device 102 is using. Each of the mobile computing devices 102 also store a current operator name (CON) and a service provider name (SPN). In some embodiments, the CON and SPN are strings.

Figure 1:
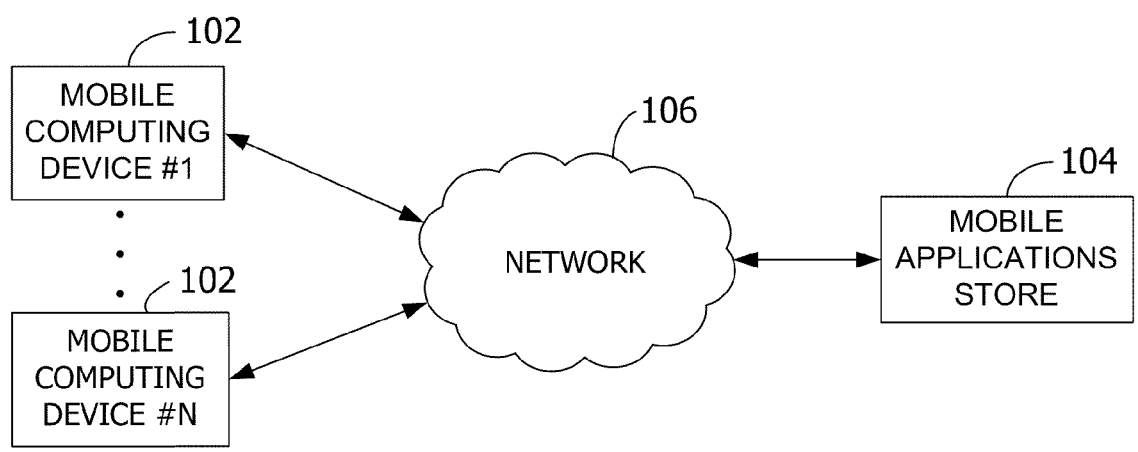
FIG. 1 is an exemplary block diagram illustrating mobile computing devices communicating with a mobile applications store.

Referring again to FIG. 1, an exemplary block diagram illustrates mobile computing devices 102 communicating with the mobile applications store 104. The mobile computing devices 102, such as mobile computing device #1 through mobile computing device #N, are associated with one or more users (not shown). The mobile computing devices 102 include portable computing devices such as laptops, netbooks, gaming devices, and/or portable media players. However, the mobile computing devices 102 may include any device executing instructions (e.g., application programs) to provide data. Further, each of the mobile computing devices 102 may represent a group of processing units or other computing devices.

The mobile computing devices 102 communicate with the mobile applications store 104 via a network 106. Exemplary networks 106 include wired and/or wireless networks, and may represent local area networks or global networks such as the Internet. In embodiments in which the network 106 includes wireless networks, the mobile computing devices 102 may be enabled with technology such as BLUETOOTH brand wireless communication services (secured or unsecured), radio frequency identification (RFID), Wi-Fi such as peer-to-peer Wi-Fi, ZIGBEE brand wireless communication services, near field communication (NFC), and other technologies that enable short-range or long-range wireless communication. In some embodiments, the network 106 includes a wireless cellular network providing Internet access.

The mobile applications store 104 includes one or more computing devices operating to provide the mobile computing devices 102 with access to content. The content includes, for example, web pages and scripts for presenting one or more mobile applications to users of the mobile computing devices 102. In some embodiments, the mobile applications store 104 is accessible via the Internet by mobile computing devices 102 executing browsers to browse, search, select, purchase, and download the mobile applications.

Figure 2:
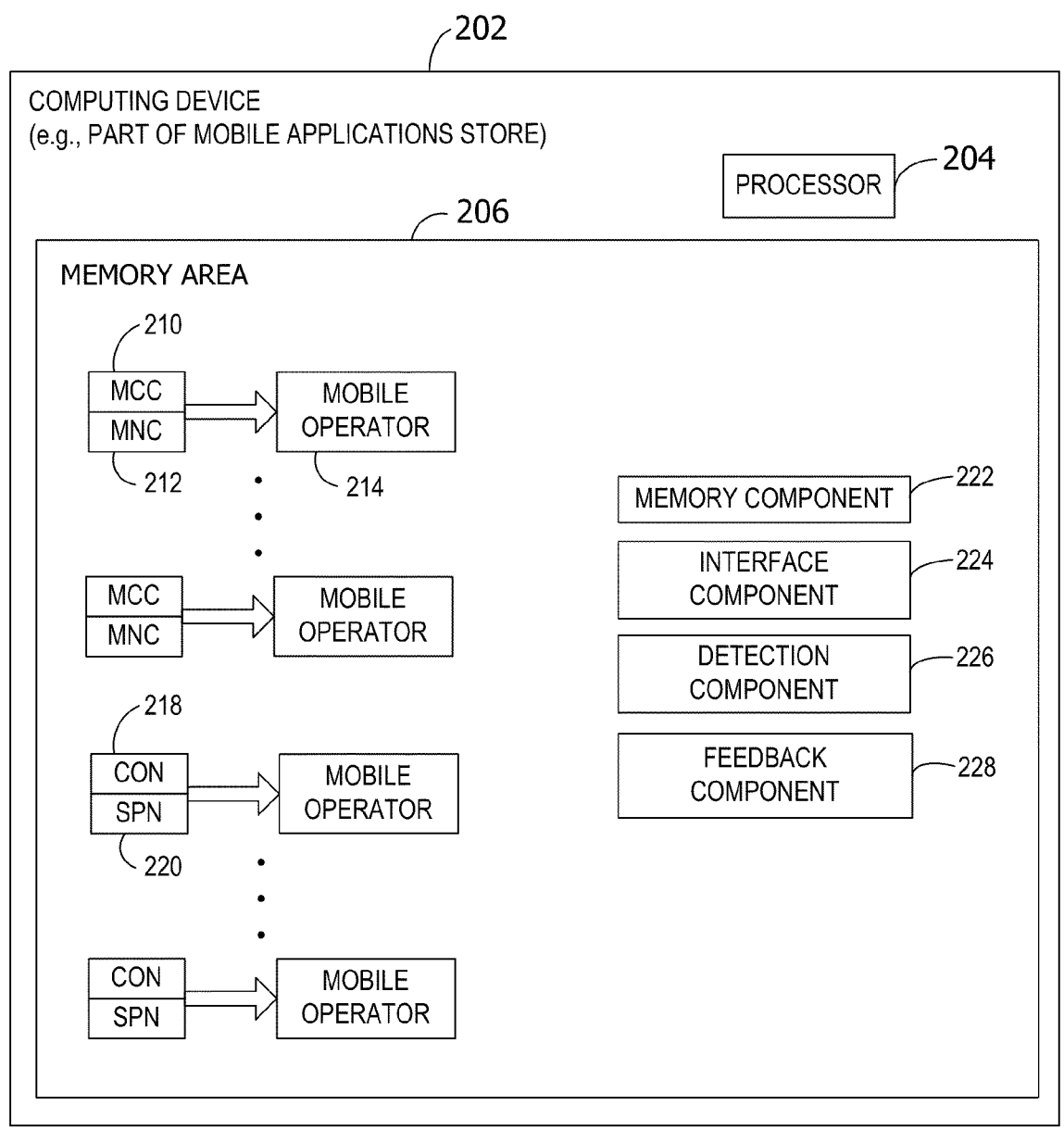
FIG. 2 is an exemplary block diagram illustrating a computing device associated with the mobile applications store.

Referring next to FIG. 2, an exemplary block diagram illustrates a computing device 202 associated with the mobile applications store 104. The computing device 202 operates to determine mobile operators 214 associated with the mobile computing devices 102. While illustrated as a single computing device 202 in FIG. 2, aspects of the disclosure contemplate other hardware configurations to provide the functionality associated with the computing device 202. For example, the functionality may be provided by a cloud service, a network of peer-to-peer devices, or other hardware or software configuration.

The computing device 202 has at least one processor 204 and one or more computer-readable media such as a memory area 206. The processor 204 includes any quantity of processing units, and is programmed to execute computer-executable instructions for implementing aspects of the disclosure. The instructions may be performed by the processor 204 or by multiple processors executing within the computing device 202, or performed by a processor external to the computing device 202 (e.g., by a cloud service). In some embodiments, the processor 204 is programmed to execute instructions such as those illustrated in the figures (e.g., FIG. 3).

The memory area 206 includes any quantity of media associated with or accessible to the computing device 202. The memory area 206 may be internal to the computing device 202 (as shown in FIG. 2), external to the computing device 202 (not shown), or both (not shown).

The memory area 206 stores a plurality of sets of MCC 210 and MNC 212 pairs. The sets are mapped, correlated, or otherwise associated with one of the mobile operators 214. The memory area 206 further stores a plurality of sets of CON 218 and SPN 220 pairs. The sets are mapped, correlated, or otherwise associated with the mobile operators 214. Exemplary MCC 210 and MNC 212 pairs correlated to mobile operators 214 and markets are shown in Table 1 below.

TABLE 1

Exemplary MCC/MNC Correlations to Mobile Operators and Markets.

| MCC | MNC | Market | Description |
|-----|-----|--------|-------------|
| 310 | 038 | US | Mobile Operator #1 |
| 310 | 120 | US | Mobile Operator #2 |
| 208 | 002 | FR | Mobile Operator #3 |
| 234 | 033 | UK | Mobile Operator #4 |
| 234 | 015 | UK | Mobile Operator #5 |

In some embodiments, the computing device 202 receives the MCC 210, MNC 212, CON 218, and SPN 220 values and correlations to the mobile operators 214 from other devices (e.g., a cloud service). Alternatively or in addition, the computing device 202 infers the correlations based on data received from the mobile computing devices 102. For example, if the computing device 202 receives the same values and correlations from a quantity of the mobile computing devices 102 exceeding a defined threshold, the computing device 202 stores the values and correlations in the memory area 206.

The processor 204 is programmed to determine the mobile operator 214 of the mobile computing devices 102 based on the IMSI received from the mobile computing devices 102. For example, the processor 204 is programmed to receive the IMSI from one of the mobile computing devices 102 and extract the MCC 210 and MNC 212 from the received IMSI. The processor 204 accesses the memory area 206 to identify the mobile operator 214 based on the extracted MCC 210 and MNC 212 and the associated correlation. In some embodiments, the processor 204 is programmed to validate the received IMSI. For example, the processor 204 may confirm that the received IMSI has fifteen digits. In another example, the processor 204 may query a database accessible to the computing device 202 to validate the MCC 210 and MNC 212 values.

If a correlation for the extracted MCC 210 and MNC 212 does not exist in the memory area 206, the processor 204 is further programmed to determine the mobile operator 214 using the CON 218 and SPN 220 values, as next described with reference to FIG. 3.

The memory area 206 further stores one or more computer-executable components for implementing aspects of the disclosure. Exemplary components include a memory component 222, an interface component 224, a detection component 226, and a feedback component 228. Execution of these components is described below with reference to FIG. 3.

At least a portion of the functionality of the various elements in FIG. 2 may be performed by other elements in FIG. 2, or an entity (e.g., processor, web service, server, application program, computing device, etc.) not shown in FIG. 2.

Figure 3:
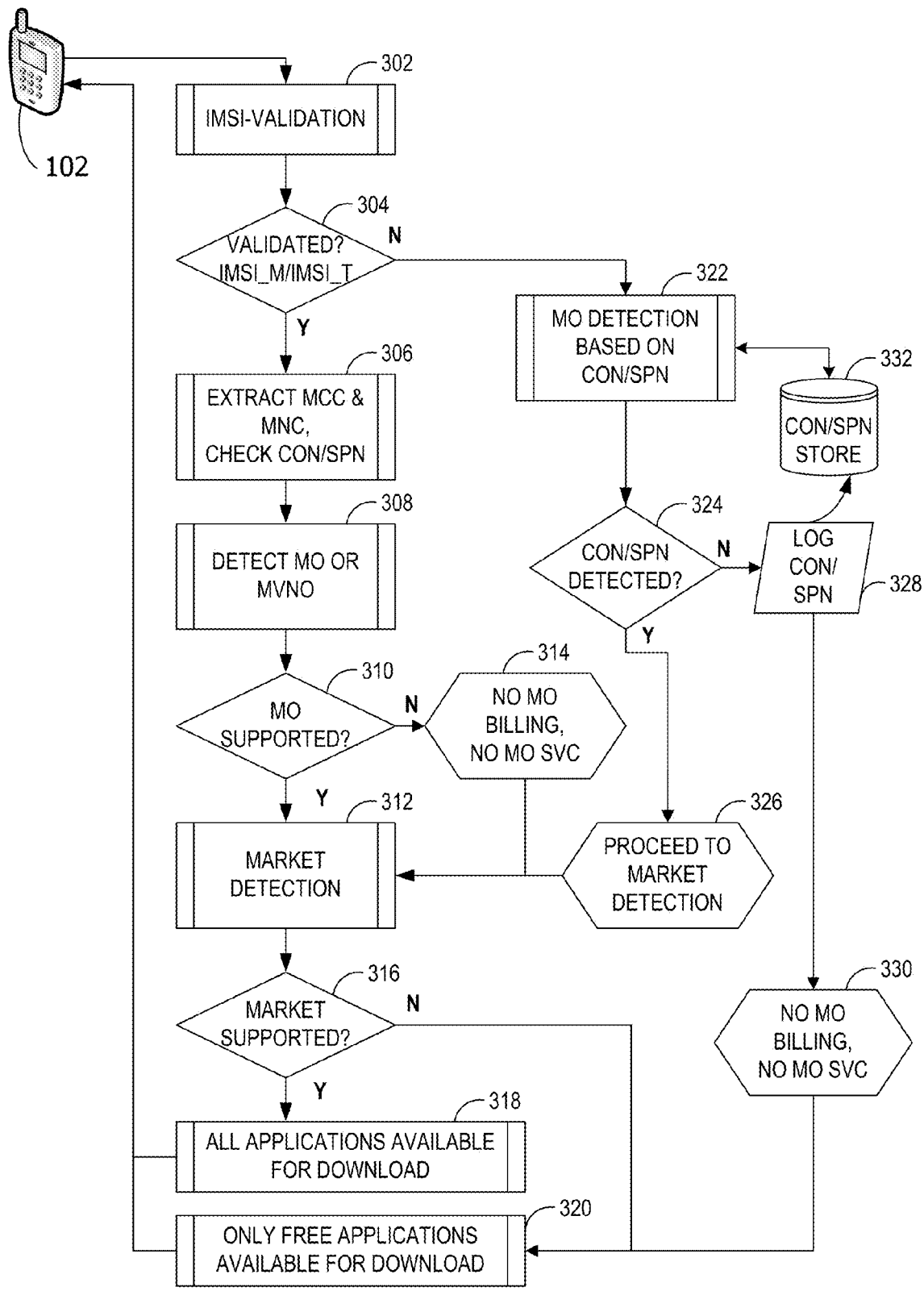
FIG. 3 is an exemplary flow chart illustrating operation of the computing device from FIG. 2 to determine a mobile operator of a mobile computing device.

Referring next to FIG. 3, an exemplary flow chart illustrates operation of the computing device 202 in FIG. 2 to determine the mobile operator 214 of one of the mobile computing devices 102. In the example of FIG. 3, the operations are performed by a service communicating with the mobile computing device 102 as a client. The service receives the IMSI, CON 218, and SPN 220 from the mobile computing device 102. In some embodiments, the mobile computing device 102 obtains the IMSI from a subscriber identity module (SIM) on the mobile computing device 102. The mobile computing device 102 obtains the CON 218 and SPN 220 from, for example, configuration settings or other memory area on the mobile computing device 102.

At 302, the service validates the received IMSI. For example, the service confirms the quantity of digits in the received IMSI value. In another example, the service validates the received IMSI by determining whether the IMSI is an IMSI_m (based on the mobile identification number) or an IMSI_t (not based on the mobile identification number). The mobile identification number is typically the 10-digit telephone number of the mobile computing device 102. An exemplary IMSI_m is 310000000000000 and an exemplary IMSI_t is 31003876768768.

If the IMSI is valid at 304, the service extracts the MCC 210 and MNC 212 from the IMSI at 306. The service may also check the CON 218 and SPN 220 values at 306 as well, and compare to CON 218 and SPN 220 to the extracted MCC 210 and MNC 212 to identify any discrepancies. At 308, the service detects the mobile operator 214 (MO) and/or the mobile virtual network operator (MVNO) based on the extracted MCC 210 and MNC 212 values. In some embodiments, the MVNO is a company that sells a mobile device to a user and manages the user relationship including billing, but does not provide or maintain the physical communication infrastructure (e.g., own the base stations).

If the detected mobile operator 214 is found or supported at 310, market detection occurs at 312. If the detected mobile operator 214 is not found or supported at 310 (e.g., the IMSI does not accurately or correctly represent the mobile operator 214), then the service disables mobile operator billing and/or mobile operator service for the mobile computing device 102 at 314.

If the detected market is supported at 316, the service provides or presents the available applications to the mobile computing device 102 at 318 for display to a user of the mobile computing device 102. The presented applications include free applications and fee-based applications. If the detected market is not supported at 316, the service disables commerce-based functions at the mobile applications store 104 for the mobile computing device 102. Commerce-based functions include purchasing, leasing, renting, or any other financial transaction associated with the visit by the mobile computing device 102 to the mobile applications store 104. In some embodiments, the service provides or presents only the free applications to the mobile computing device 102 at 320.

If the received IMSI is determined to be invalid at 304, mobile operator detection proceeds at 322 based on the received CON 218 and SPN 220. For example, if the service supports the received CON 218 and SPN 220 at 324 (e.g., finds the CON 218 and SPN 220 in the sets stored in the memory area 206), the service proceeds at 326 to detect the market at 312 based on the CON 218 and SPN 220. If the service does not recognize the CON 218 and SPN 220 at 324 (e.g., cannot find or support a correlation for the CON 218 and SPN 220 in the memory area 206), the service logs the received CON 218 and SPN 220 pair at 328 and disables commerce functions for the mobile computing device 102 (e.g., only presenting free applications at 320). For example, the service disables mobile operator billing and/or mobile operator service at 330. If, over a time period, the service receives a threshold quantity of a particular CON 218 and SPN 220 pair, the service stores the CON 218 and SPN 220 pair along with the correlation to the mobile operator 214 in the memory area 206 at 332. Because of these self-correcting operations, the service is then able to recognize the CON 218 and SPN 220 pair when subsequently received from other mobile computing devices 102.

An example of a CON 218 and SPN 220 pair includes CON="Spring PCS" and SPN="Sprint". Another example pair is CON="Telstra" and SPN="Telstra". In some embodiments, SPN is empty.

While the operations illustrated in FIG. 3 use the CON 218 and SPN 220 to determine the mobile operator 214 as a backup to using the IMSI, other embodiments are contemplated. For example, the CON 218 and SPN 220 may be used without using the IMSI. In such embodiments, the processor 204 is programmed to receive one of the CONs 218 and one of the SPNs 220 from one of the mobile computing devices 102. The processor 204 is further programmed to access the memory area 206 to identify the mobile operator 214 associated with the received CON 218 and the received SPN 220 based on the stored correlation. The processor 204 executes to enable billing of the identified mobile operator 214 for purchases made by the mobile computing device 102. In other embodiments, identifying the mobile operator 214 enables tax calculations or other financial calculations for the mobile computing device 102.

In further embodiments, the IMSI and the CON 218 and SPN 220 are used to determine the mobile operator 214. The service then compares the mobile operator 214 determined using the IMSI with the mobile operator 214 determined using the CON 218 and SPN 220 to identify a discrepancy. If a discrepancy is identified, the service may mark the correlations in the memory area 206 as suspect or remove the correlations.

Further, one or more of the operations illustrated in FIG. 3 may be implemented as software instructions encoded on a computer-readable medium, in hardware programmed or designed to perform the operations, or both. As an example, the operations in FIG. 3 may be implemented as computer-executable components or other software such as in the components illustrated in FIG. 2. In such an example, the memory component 222, when executed by the processor 204, causes the processor 204 to store a plurality of the sets of CONs 218 and SPNs 220. The memory component 222 further stores a correlation between each of the sets and the mobile operator 214. The interface component 224, when executed by the processor 204, causes the processor 204 to receive one of the CONs 218 and one of the SPNs 220 from the mobile computing device 102. The detection component 226, when executed by the processor 204 causes the processor 204 to search the plurality of sets stored by the memory component 222 for the CON 218 and SPN 220 received by the interface component 224. The feedback component 228, when executed by the processor 204, causes the processor 204 to identify the mobile operator 214 associated with the received CON 218 and the received SPN 220 based on the correlation associated therewith if the received CON 218 and received SPN 220 are found by the detection component 226. Otherwise, the feedback component 228 instructs the memory component 222 to store the received CON 218 and the received SPN 220 (e.g., without identifying any mobile operator 214). In an embodiment in which a user browses the mobile applications store 104 with the mobile computing device 102, the feedback component 228 disables commerce functions for the mobile computing device 102 if the received CON 218 and the received SPN 220 are not found by the detection component 226.

The interface component 224 may further receive a plurality of CONs 218 and a plurality of SPNs 220 that are not found within the sets stored by the memory component 222. The feedback component 228 associates the mobile operators 214 with the received pluralities of CONs 218 and SPNs 220 if the received pluralities of CONs 218 and SPNs 220 exceed a pre-defined threshold value. For example, if five hundred mobile computing devices 102 provide the same CON/SPN pair, the feedback component 228 accepts the correlation and adds that pair to a table of correlations between CON/SPN pairs and one of the mobile operators 214.

In some embodiments, the operations illustrated in FIG. 3 are performed by the computing device 202. In other embodiments, one or more of the operations illustrated in FIG. 3 are performed by another computing device (e.g., as a web service) or peer-to-peer devices. Further, one or more of the operations illustrated in FIG. 3 may be performed by the mobile computing devices 102.

Additional Examples

While embodiments have been described with reference to data collected from users, aspects of the disclosure provide notice to the users of the collection of the data (e.g., via a dialog box or preference setting) and the opportunity to give or deny consent. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for identifying the mobile operator 214 for the mobile computing device 102 based on the IMSI, and exemplary means for identifying the mobile operator 214 for the mobile computing device 102 based on the CON 218 and SPN 220.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for determining a mobile operator associated with a mobile computing device, said system comprising:
    a memory for storing a plurality of sets of pairs of current operator names (CONs) and service provider names (SPNs), each pair of the sets of pairs of the CON and the SPN being associated with a corresponding mobile operator, the CON representing a mobile operator currently serving the mobile computing device and the SPN representing a mobile operator to whom the mobile computing device is subscribed; and
    a processor programmed to:
        receive, over a network, from a plurality of mobile computing devices, a plurality of pairs of the CONs and the SPNs, each pair of the plurality of pairs of the CONs and the SPNs including additional data representing the corresponding mobile operator of the pair;
        determine, from the received plurality of pairs, a quantity of received first pairs having the same values of the CONs, the SPNs and the additional data;
        compare the quantity of the received first pairs with a threshold value;
        on determining that the quantity of the received first pairs exceeds the threshold value, store the values of the CONs, the SPNs and the additional data representing the corresponding mobile operator of the first pairs in the memory;
        receive an international mobile subscriber identity (IMSI), one of the CONs, and one of the SPNs from the mobile computing device over the network, the one of the CONs and the one of the SPNs being separate from the IMSI of the mobile computing device;
        determine validity of the IMSI of the mobile computing device received over the network;
        on determining that the IMSI is invalid, determine if the received CON and the received SPN match the values of the CONs and the SPNs of the first pairs stored in the memory;
        on determining that the received CON and the received SPN match the values of the CONs and the SPNs of the first pairs stored in the memory, identify the corresponding mobile operator from the additional data associated with the first pairs; and
        bill the identified mobile operator for purchases made by the mobile computing device.

2. The system of claim 1, wherein the processor is further programmed to:
    receive another IMSI from the mobile computing device over the network;
    extract, on determining that the another IMSI is valid, a mobile country code (MCC) and a mobile network code (MNC) from the received IMSI; and
    determine a mobile operator associated with the mobile computing device based on the extracted MCC and MNC.

3. The system of claim 2, wherein the processor is further programmed to compare the received CON and the received SPN to the extracted MCC and MNC to identify a discrepancy.

4. The system of claim 3, wherein the processor is further programmed to remove the additional data representing the mobile operator associated with the first pairs on identifying the discrepancy.

5. The system of claim 2, wherein the processor is further programmed to identify the mobile operator using the received CON and the received SPN when a correlation for the extracted MCC and MNC with the mobile operator does not exist in the memory.

6. The system of claim 1, wherein the processor is further programmed to identify a market for the mobile computing device based on the identified mobile operator.

7. The system of claim 1, wherein the memory further stores a market associated with the mobile operator.

8. The system of claim 1, wherein the one of the CONs and the one of the SPNs are received from configuration settings of the mobile computing device.

9. The system of claim 1, wherein the processor is programmed to receive CONs and SPNs with the additional data representing the corresponding mobile operators from a cloud service.

10. A computer implemented method comprising:
receiving an international mobile subscriber identity (IMSI), a current operator name (CON), and a service provider name (SPN) from a mobile computing device over a communication network, the CON representing a mobile operator currently serving the mobile computing device and the SPN representing a mobile operator to whom the mobile computing device is subscribed;
receiving, over the communication network, from a plurality of mobile computing devices, a plurality of pairs of the CONs and the SPNs, each pair of the plurality of pairs of the CONs and the SPNs including additional data representing a corresponding mobile operator of the pair;
determining, from the received plurality of pairs of the CONs and the SPNs, a quantity of received first pairs having the same values of the CONs, the SPNs and the additional data representing the corresponding mobile operator of the first pairs;
comparing the quantity of the received first pairs with a threshold value; on determining that the quantity of received first pairs exceeds the threshold value, storing the values of the CONs, the SPNs and the additional data representing the corresponding mobile operator of the first pairs;
determining validity of the IMSI of the mobile computing device received over the communication network;
on determining that the received IMSI is invalid, determining if the received CON and the received SPN match the stored values of the CON and the SPN of the first pairs;
on determining that the received CON and the received SPN match the stored values of the CONs and the SPNs of the first pairs, identifying the mobile operator associated with the received CON and the received SPN from the additional data associated with the first pairs; and
billing the identified mobile operator for purchases made by the mobile computing device.

11. The method of claim 10, further comprising identifying a discrepancy, on determining that the IMSI is valid, by comparing the received CON and the received SPN to a mobile country code (MCC) and a mobile network code (MNC) extracted from the IMSI.

12. The method of claim 11, further comprising removing, on identifying the discrepancy, a correlation between the received CON, received SPN and the mobile operator.

13. The method of claim 10, wherein one of a plurality of mobile operators is associated with a plurality of same pairs of CONs and SPNs received from a plurality of mobile computing devices only when the received pluralities of same pairs of CONs and SPNs exceed a pre-defined threshold value.

14. The method of claim 10, wherein determining validity of the IMSI comprises confirming that the received IMSI has 15 digits.

15. The method of claim 10, further comprising identifying a market for the mobile computing device based on the received CON and the received SPN.

16. One or more computer storage memories storing computer-executable components, said components when executed by at least one processor cause the at least one processor to:
receive an international mobile subscriber identity (IMSI), a current operator name (CON), and a service provider name (SPN) from a mobile computing device over a communication network, the CON representing a mobile operator currently serving the mobile computing device and SPN representing a mobile operator to whom the mobile computing device is subscribed;
receive, over the communication network, from a plurality of mobile computing devices, a plurality of pairs of the CONs and the SPNs, each pair of the plurality of pairs of the CONs and the SPNs including additional data representing a corresponding mobile operator of the pair;
determine, from the received plurality of pairs of the CONs and the SPNs, a quantity of received first pairs having the same values of the CONs, the SPNs and the additional data representing the corresponding mobile operator of the first pairs;
compare the quantity of the received first pairs with a threshold value;
on determining that the quantity of received first pairs exceeds the threshold value, store the values of the CONs, the SPNs and the additional data representing the corresponding mobile operator of the first pairs;
determine validity of the IMSI of the mobile computing device received over the communication network;
on determining that the received IMSI is invalid, determine if the received CON and the received SPN match the stored values of the CON and the SPN of the first pairs;
on determining that the received CON and the received SPN match the stored values of the CONs and the SPNs of the first pairs, identify the mobile operator associated with the received CON and the received SPN from the additional data associated with the first pairs; and
bill the identified mobile operator for purchases made by the mobile computing device.

17. The computer storage memories of claim 16, wherein the received CON and the received SPN are compared to a mobile country code (MCC) and a mobile network code (MNC) extracted from the IMSI to identify a discrepancy, the MCC and MNC being extracted on determining that the IMSI is valid.

18. The computer storage memories of claim 17, wherein the additional data representing the mobile operator associated with the first pairs is removed on identifying the discrepancy.

19. The computer storage memories of claim 16, wherein a market is identified for the mobile computing device based on the identified mobile operator.

20. The computer storage memories of claim 16, wherein the CON and the SPN are received from the configuration settings of the mobile computing device.

* * * * *